United States Patent [19]

Rash

[11] 4,395,052
[45] Jul. 26, 1983

[54] URANIUM SLURRY HAULING SYSTEM

[75] Inventor: Curtis W. Rash, Corpus Christi, Tex.

[73] Assignee: Proco, Inc., Corpus Christi, Tex.

[21] Appl. No.: 136,487

[22] Filed: Apr. 3, 1980

[51] Int. Cl.³ .............................................. B60P 3/22
[52] U.S. Cl. .................................... 280/5 C; 105/358;
250/506.1; 280/5 G; 280/5 R; 410/87
[58] Field of Search ............. 280/5 R, 5 F, 5 G, 5 C,
280/5 E, 5 D; 105/392.5, 453, 358, 360, 362;
410/47, 48, 49, 87, 66; 206/446; 250/506, 507

[56] References Cited

U.S. PATENT DOCUMENTS

| | | | |
|---|---|---|---|
| 1,085,237 | 1/1914 | Bell | 410/87 |
| 2,904,340 | 9/1959 | Simpson | 410/49 |
| 3,391,280 | 7/1968 | Bonilla | 250/506 |
| 3,478,968 | 11/1969 | McKinney | 280/5 C X |
| 3,726,431 | 4/1973 | Botkins | 206/446 X |
| 3,754,140 | 8/1973 | Beirle | 250/507 |

Primary Examiner—Joseph F. Peters, Jr.
Assistant Examiner—Donn McGiehan
Attorney, Agent, or Firm—G. Turner Moller

[57] ABSTRACT

There is disclosed a uranium slurry hauling system comprising a low-boy trailer on which are mounted a pair of substantially identical slurry tanks. Each of the tanks comprises a generally horizontal cylindrical vessel surrounded by a protecting framework rigid with the trailer. The tanks are connected to the trailer frame in a fashion which allows racking movement of the trailer independently of the tanks, i.e. without imparting racking forces to the tanks. The trailer also provides a support location for a third substantially identical tank and is designed to carry two loaded tanks or three empty tanks.

13 Claims, 4 Drawing Figures

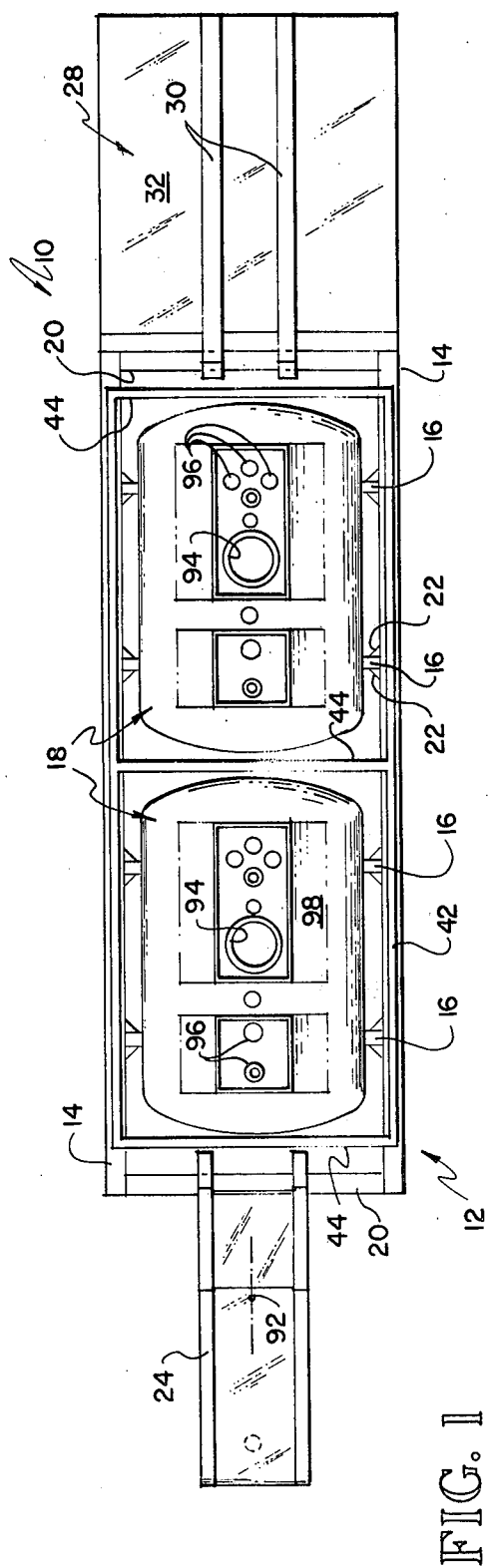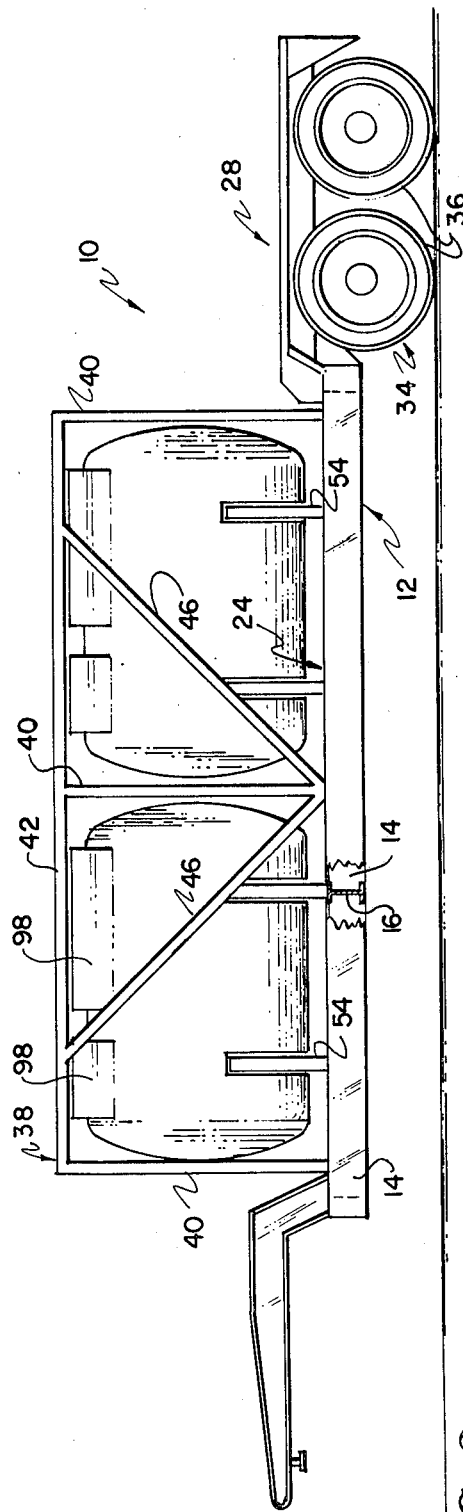

URANIUM SLURRY HAULING SYSTEM

This invention relates to a liquid uranium slurry, yellow cake, or powder uranium hauling system and more particularly to a vehicle or trailer carrying a plurality of liquid uranium slurry tanks.

One of the recent developments in uranium production is the growing acceptance of in situ solution mining of uranium bearing ores. In situ solution mining of uranium basically contemplates the drilling of a large number of wells into the ore body, injecting water or a water-chemical mixture into many of the wells, allowing the injected water to flow through the ore body toward the remaining wells which are known as producing wells, and producing a weak solution of the uranium ore at the surface through the producing wells.

Numerous processing steps must be conducted on the produced uranium solution before the extracted uranium is ready to be processed into fuel rods. Although the exact type of processing steps varies somewhat, it is clear that in almost any economic situation, there is a requirement for hauling liquid uranium slurry.

One of the facts of life is that uranium production, particularly in situ solution mining operations, are fairly widely dispersed because the uranium ore bodies which can be economically mined by solution mining are fairly widely dispersed. Consequently, there are presently a fair number of dispersed in situ mining operations and a much smaller number of facilities to refine or conduct additional processing steps on the extracted uranium.

Although there are many engineering decisions to be made involving compromises of various sorts, the basic approach of the industry is now becoming clear. The produced uranium solution is quite low in uranium content. Rather than haul vast tonnages of the weak produced solution to a central refinery, some technique is employed near the mining site to concentrate the solution so that transportation problems are not insurmountable. One such concentrating technique involves an ion-exchange process in which the uranium ore in the produced solution collects on an ion-exchange bed and the effluent water or water-chemical mixture is reinjected into the injection wells. The ion-exchange beds are periodically washed to remove the collected uranium to produce a liquid uranium slurry which is about a 50—50 mixture of the uranium ore and water. This slurry is hauled from the producing site to the distant refinery for the subsequent processing steps that are necessary. There are, of course, regulatory agencies which control the technique and apparatus for hauling the uranium slurry.

The only known tank that has been specifically designed to haul uranium slurry of this type is shown in U.S. Pat. No. 3,726,431. This tank can be mounted on and demounted from a conventional trailer. Its nominal capacity is 100 barrels but, because of regulation, only 60 barrels of the slurry can be transported. There are several reasons for this 60% limitation. First, when greater than 60 barrels is transported in a single tank, radiation from the uranium slurry exceeds a safe predetermined level. Second, a substantial amount of void space in the tank must be provided to allow injection of nitric acid and steam to liquidify the uranium slurry for unloading and to prevent bursting of the tank in the event the slurry freezes.

The basic transportation plan involving the tank shown in U.S. Pat. No. 3,726,431 is to provide a multiplicity of specially designed uranium slurry tanks at the producing site. When one of these tanks is filled, the tank is attached to a trailer which is towed by a truck from the producing site to the refinery. The filled tank can be removed and an empty tank, from which the uranium slurry has already been removed, is attached to the trailer. The truck then drives back to the producing site, the empty tank is removed and a full tank is placed on the trailer and the process is repeated.

There are a number of problems associated with this plan. First, the amount of slurry that can be hauled by a single truck-trailer rig is limited to 60 barrels. Thus, the unit cost per barrel of slurry is quite high. Second, considerable means are taken to assure the structural integrity of the uranium carrying tank. It has been discovered in the course of developing this invention that substantial advantages occur if the tank is mounted on the trailer frame in a fashion that isolates the tank from racking loads imposed on the trailer. Using this technique, the tank need not have the intricate supporting framework disclosed in U.S. Pat. No. 3,726,431. Third, one of the things that will inevitably happen with the prior art is that when a truck is at the refinery and ready to leave, there may be no empty tank available to return to the producing site. Accordingly, one of two things will happen: (1) the tractor-trailer rig and driver will have to wait at the refinery until an empty tank is available; or (2) the rig and driver will return empty to the producing site. The effect of this is that the transporter must provide a surplus of tanks so that there are always tanks available at the refinery.

This invention is directed at problems of reducing net cost of hauling liquid uranium slurry, at reducing the cost and complexity of liquid uranium slurry hauling equipment and at reducing the requirement of surplus tanks.

The first concept of this invention is to reduce the size of each individual tank and to mount a plurality of the smaller tanks on a trailer for transport. It happens that the radiation emitting from two slightly smaller tanks, which together exceed the capacity of one large tank, remains below the safe predetermined radiation limit imposed by regulatory agencies.

The second concept of this invention is that the tanks are attached to the trailer frame in such a manner as to isolate the tanks from racking loads imparted to the trailer.

The third concept of this invention is that the trailer, which is designed to carry a plurality of the loaded smaller tanks, has the capability of carrying an additional tank or other equipment when the tanks are empty. Thus, when the rig is leaving the refinery destined to the producing site, the trailer can haul one of the prior art tanks back to the producing site.

To these ends, the trailer of this invention comprises a frame having wheels at one end and a towing tongue at the other for attachment to a tractor type truck. The trailer is preferably of the low-boy type to lower the center of gravity of the trailer when the tanks are loaded. The trailer is accordingly provided with a first load carrying portion intermediate the tongue and the wheels and a second load carrying portion substantially immediately above the wheels. A pair of substantially identical slurry carrying tanks are supported on the first load carrying portion of the trailer. A framework, rigid with the trailer, surrounds the tanks to provide roll over protection and to minimize the possibility of tank puncture in a collision. The tanks are connected to the trailer in such a fashion to allow limited vertical movement of the trailer frame relative to the tanks. The weight of the trailer and the pair of tanks, when loaded, do not exceed a predetermined limit. In addition, the weight of the trailer, the two empty tanks and any additional equipment carried on the second load carrying portion does not exceed the same predetermined amount.

It is accordingly an object of this invention to provide an improved uranium slurry hauling system which is effective to reduce unit transportation costs of the slurry.

Another object of this invention is to provide a trailer having a plurality of slurry tanks thereon which are mounted on the trailer to isolate the tanks from racking loads imparted to the trailer.

Other objects and advantages of this invention will become more fully apparent as this description proceeds, reference being made to the accompanying drawings and appended claims.

IN THE DRAWINGS

FIG. 1 is a top plan view of a trailer in accordance with the principles of this invention;

FIG. 2 is a side elevational view of the trailer of FIG. 1;

Figure 3:
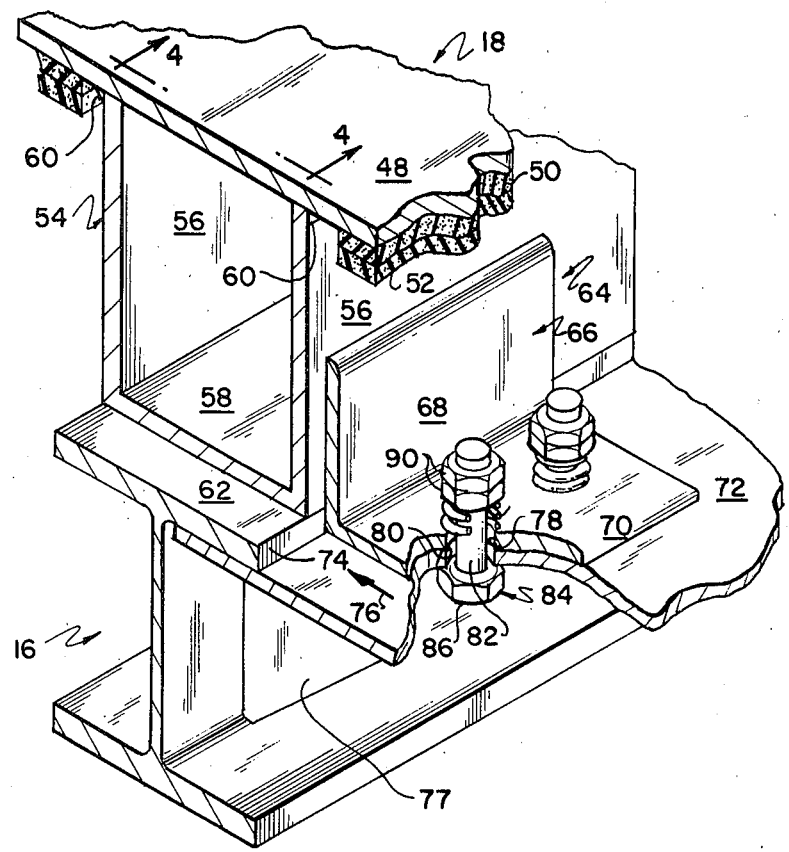
FIG. 3 is an enlarged partial isometric view of one of the mechanisms which connect the tanks to the trailer frame.
Figure 4:
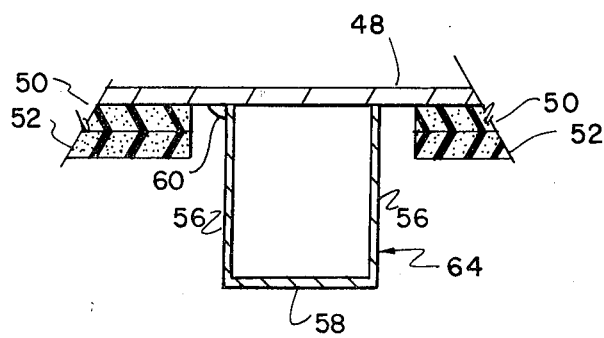
FIG. 4 is an enlarged cross-sectional view taken along line 4—4 of FIG. 3, as viewed in the direction indicated by the arrows.

Referring to FIGS. 1 and 2, there is illustrated a lowboy trailer 10 comprising a frame 12 including a plurality of longitudinally extending beams 12 interconnected by a plurality of transverse beams which directly carry a pair of tanks 18 and a plurality of transverse beams 20 which do not directly support the tanks 18. Although the tanks 18 may be made of any suitable material, stainless steel is preferred for hauling uranium slurry. Suitable gussets 22 may be provided as desired. A towing tongue 24 extends forwardly of the front beams 20. It will accordingly be seen that the trailer frame 12 provides a first load carrying portion 26 immediately rearwardly of the tongue 24. A second load carrying portion 28 is provided by the trailer frame 12 in the form of a plurality of elevated longitudinally extending beams 30 and suitable platework 32 under which is mounted an axle and wheel assembly 34 including a plurality of ground engaging wheels 36. A suitable adjustable foot (not shown) may be provided toward the forward or tongue end of the trailer 10 in order to elevate the tongue 24 during storage in a conventional manner.

It will accordingly be seen that the trailer 10, as heretofore described, is a more-or-less conventional lowboy type trailer although it has a number of unusual design features which cooperate with the tanks 18. Specifically, the trailer 10 has sufficient load capacity to carry the tanks 18 when filled to designed capacity, has the load capacity to carry the tanks 18 when they are empty and to carry an additional tank or other equipment on the second load carrying portion 28 and provides an upstanding rigid framework 38 surrounding the tanks 18 to provide roll over protection and other safety features. The framework 38 is rigid with the trailer frame 12 and comprises a plurality of upstanding columns 40, a pair of longitudinally extending beams 42, a plurality of transversely extending beams 44 and suitable diagonal struts 46. It will accordingly be seen that the framework 38 provides the periphery of a box on the exterior of the tanks 18. The framework 38 accordingly provides a substantial measure of structural protection in the event the trailer 10 turns over in an accident.

As mentioned previously, there is provided a plurality of tanks 18 rather than a single tank since the radiation emitting from a single tank containing a given amount of uranium slurry is greater than the radiation emitting from the same quantity of slurry disposed in two tanks. This advantage can be acted upon in one of two fashions. First, if the construction techniques are the same, a greater quantity of uranium slurry can be carried in a plurality of tanks than in a single tank. For example, the nominal capacity of the device built in accordance with U.S. Pat. No. 3,726,431 is 100 barrels. Because of regulations, only 60% of the nominal capacity or 60 barrels of slurry can be transported in this tank. In accordance with this invention, each of the tanks 18 could be of a nominal 50 barrel capacity and could, by regulation, carry 60% of its nominal capacity or 30 barrels for a total of 60 barrels. In the alternative, and preferably, this advantage can be acted upon by changing the mode of construction of the tanks 18. Because the radiation level of a single tank device is so high, the construction must be in accordance with extremely strict code requirements imposed by the Department of Transportation. Since DOT construction regulations are substantially lower when the radiation level is lower, the tanks 18 and its surrounding framework may be constructed to much simpler requirements.

As shown best in FIG. 3, the tanks 18 comprise a cylindrical stainless steel shell 48 having stainless steel endcaps (not shown) welded thereto. A coating 50 of urethane foam is applied to the exterior shell 48 for thermally insulating the contents of the tank 18. This is of particular advantage in two situations. First, in winter, freezing of the uranium slurry is retarded. This allows the filled tanks 18 to be transported and/or to sit at the refinery site for a longer time during winter without freezing. Second, in summer, heating of the tank contents is retarded. This minimizes pressure buildup in the tanks 18 due to temperature increases. A fiberglass shell or cover 52 is affixed to the coating 50.

Supporting each of the tanks 18 is a pair of saddles 54. Each saddle 52 extends substantially across the transverse dimension of the tank 18 and includes a pair of planar upstanding legs 56 and a horizontal bottom wall 58. The upstanding legs 56 provide upwardly concave surfaces to receive the curved shell 48. The legs 56 are bonded to the shell 48 by the provision of weldments 60. As is apparent from FIG. 3, the weldments 60 are visible from the underside of the tanks 18 since the coating 50 and fiberglass shell 52 are cut away to expose the weldments 60. Accordingly, the weldments 60 and the adjacent bonded areas of the shell 48 and legs 56 can be visually inspected for cracks, impending failure and the like without removing the coating 50 and/or the fiberglass shell 52.

The saddles 54 are spaced apart at the same spacing as the transverse beams 16 so that the saddle bottom 58 is supported on the upper flange 62 of the I-beams 16. Means 64 is provided to connect the saddles 54 to the trailer frame 12. The connecting means 64 comprises an angle 66 including an upstanding leg 68 which is welded or otherwise secured to one of the upstanding legs 56. The angle 66 also includes a horizontal leg 70 which is disposed below the underside of the saddle bottom 58 and abuts against a plate 72 welded to the beam 16. Since the leg 68 abuts one of the sides 74 of the flange 62, interference prevents movement of the saddle 54 and tank 18 in the direction indicated by the arrow 76. One or more gussets 77, welded to the beam 16 and plate 72, support the plate 72.

The angle leg 70 is provided with a pair of spaced openings 78 which align with similar openings 80 in the plate 72. Extending through each pair of aligned openings 78, 80 is a shank 82 of a bolt 84 having a head 86 under the plate 72. A rather stiff compression spring 88 is captivated between the angle leg 70 and a pair of nuts 90 threaded on the end of the bolt shank 82. In a trailer built in accordance with this invention, the springs 88 each have a load capacity of 880 pounds and have a spring rate of 1060 pounds/inch. It will accordingly be seen that the tank 18 is mounted for limited vertical movement.

Each of the saddles 54 is preferably provided with a pair of the connecting means 64. At least two of the connecting means 64 on each of the tanks 18 is oppositely facing in the sense that two of the connecting means 64 prevent horizontal tank movement in the direction shown by the arrow 76 while the remaining two prevent horizontal tank movement in a direction opposite to the arrow 76. Accordingly, each tank 18 is constrained against movement parallel to an axis 92 of the trailer 10 and is free for limited vertical movement as allowed by the springs 88.

One particular advantage of the connecting means 64 is that it isolates the tanks 18 from racking forces imposed on the trailer during movement along a highway. A racking force is here defined as one which tends to twist the trailer frame 12 about a generally longitudinal horizontal axis. For example, if the trailer wheels 36 on the shoulder side of the roadway pass over a rise or bump while the trailer wheels 36 on the traffic side remain on a generally horizontal plane, the right rear of the trailer 10 tends to rise. Since the fifth wheel connection (not shown) between the trailer 10 and its towing tractor truck normally allows only rotational or pivotal movement about a vertical axis, this causes a torsional load to be imposed on the trailer frame 12. This torsional load is known as a racking force.

With the connecting means 64, this racking load is not imparted to the tanks 18 since the springs 88 allow limited and independent vertical movement of the angles 66 relative to the transverse beam 16. Assuming for purposes of explanation that the illustration of FIG. 3 is of the left rear connection between the rear most tank 18 and the trailer frame 12 when the exemplary racking force is imposed on the trailer frame 12, the saddle 54 will move upwardly so that the saddle bottom 58 is temporarily spaced from the beam flange 62. This is caused by the elevation of the right side of the transverse beam 16 which elevates the right end of the saddle 54. It will accordingly be seen that the connecting means 64 transmits forces between the trailer frame 12 and the tanks 18 in horizontal directions parallel to the trailer axis 92, transmits the vertical load of the tank 18 onto the transverse beams 16, and transmits vertical loads to the beams 16 in the event the tanks 18 move vertically sufficient to collapse the springs 88. It will likewise be seen that the connecting means 64 isolates the tanks 18 from racking movement or racking forces imposed on the trailer frame 12.

In a trailer built in accordance with FIGS. 1 and 2, the tanks 18 have a nominal capacity of about 50 barrels each and can carry, by regulation 60% of their nominal capacity, or about 30 barrels. Assuming a maximum slurry weight of 16 pounds per gallon, the designed capacity of the load trailer 10 is 61,670 pounds while the empty trailer weighs approximately 21,350 pounds. It will accordingly be seen that there is a load capacity of approximately 40,000 pounds. When the trailer 10 is returning from the refinery site when the tanks 18 will be empty, it will be appreciated that a load of somewhat less than 40,000 pounds can be accommodated at the second load carrying portion. This is sufficient to carry one of the prior art tanks if such is desired.

Another advantage of the low boy arrangement of the trailer 10 is that the center of gravity of the loaded tanks 18 is lowered substantially as compared to the situation if the trailer frame 12 were not of the low boy variety.

As shown in FIGS. 1 and 2, each of the tanks 18 includes a manway 94 and a plurality of fittings 96 which are normally closed to provide a plurality of functions. These functions including loading and unloading of slurry into and out of the tanks 18, to inject steam into the tanks 18 to "roll" the slurry for melting any frozen mixture and for suspending the uranium ore particles, to provide a "burst" plug in the event of pressure buildup inside the tank, and the like. It will be apparent to those skilled in the art that the steam and unloading fittings connect to a conduit best shown extending into the tank 18. Suitable platework 98 protects the fittings 96 and manway 94 in the event of rollover.

Although the invention has been described in its preferred form with a certain degree of particularlity, it is understood that the present disclosure has been made only by way of example and that numerous changes in the details of construction and the combination and arrangement of parts may be resorted to without departing from the spirit and scope of the invention as hereinafter claimed. It is intended that the patent shall cover, by suitable expression in the appended claims, whatever features of patentable novelty exist in the invention disclosed.

I claim:

1. A trailer for hauling liquid uranium slurry, comprising a frame having a plurality of longitudinally extending frame members, a plurality of transverse frame members rigid with the longitudinally extending frame members, wheels at one end of the frame defining a path of trailer movement generally parallel with the longitudinal frame member and a towing tongue at the other frame end for connection to a towing vehicle;

a generally cylindrical liquid slurry tank having a horizontal cylindrical axis generally parallel to the direction of travel and including at least one depending saddle mounted in direct load supporting relation with one of the transverse frame members;

a metal framework rigid with the trailer frame members for protecting the tank during trailer rollover, the framework comprising upstanding members extending to adjacent the height of the tank and horizontal members extending to adjacent the length of the tank; and means confining the saddle and allowing racking movement of the frame independent of the tank, comprising means constraining the saddle against movement parallel to the direction of travel; and means allowing independent limited upward vertical movement of the saddle relative to the frame.

2. The trailer of claim 1 wherein the constraining means comprises a first member, rigid with the saddle, abutting one of the transverse frame members for precluding saddle movement in a first direction parallel to the direction of travel.

3. The trailer of claim 2 wherein said tank comprises a pair of spaced depending saddles and the constraining means comprises a second member, rigid with one of the saddles, abutting one of the transverse frame members for precluding saddle movement in a second direction parallel to the direction of travel and opposite from the first direction.

4. The trailer of claim 3 wherein the trailer frame includes a horizontal member and the limited movement allowing means comprises a horizontal section rigid with the saddles overlying the horizontal frame member, the limited movement allowing means comprises means operative between the horizontal frame member and the horizontal section.

5. The trailer of claim 4 wherein the limited movement allowing means comprises a spring.

6. The trailer of claim 5 wherein the horizontal section provides an opening therethrough and the limited movement allowing means comprises an upstanding rod extending through the opening, and means captivating the spring on the rod.

7. The trailer of claim 6 wherein the upstanding rod comprises a threaded member and the constraining means comprises a nut.

8. The trailer of claim 7 wherein the horizontal section is rigid with the first member.

9. The trailer of claim 1 wherein the trailer frame is of the low boy type.

10. The trailer of claim 1 wherein the trailer frame comprises a horizontal member and the limited movement allowing means comprises a horizontal section rigid with the saddles overlying the horizontal frame member, the limited movement allowing means comprises lost motion means operative between the horizontal frame member and the horizontal section.

11. The trailer of claim 1 wherein the saddle comprises a pair of spaced vertical plates perpendicular to the cylindrical axis and a bottom wall spanning the vertical plates, the bottom wall resting directly on the one transverse frame member and weldments connecting the cylindrical tank and vertical plates.

12. The trailer of claim 11 further comprising an insulating covering about the cylindrical tank and a fiberglass coating adhered to the insulating covering, the coating and covering being spaced from the saddle and weldments to expose the weldments to visual examination.

13. The trailer of claim 1 further comprising at least one additional generally cylindrical liquid slurry tank having a horizontal cylindrical axis aligned with the axis of the first mentioned tank.

* * * * *